United States Patent
Lee et al.

(10) Patent No.: US 9,606,400 B2
(45) Date of Patent: Mar. 28, 2017

(54) DISPLAY PANEL

(71) Applicant: Samsung Display Co., Ltd., Yongin, Gyeonggi-Do (KR)

(72) Inventors: Kwang Keun Lee, Osan-si (KR); Young Min Kim, Yongin-si (KR); Jae Byung Park, Seoul (KR); Hae Il Park, Seoul (KR); Mun-Ki Sim, Seoul (KR); Seon-Tae Yoon, Seoul (KR); Baek Hee Lee, Yongin-si (KR); Jun Han Lee, Incheon (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 210 days.

(21) Appl. No.: 14/287,513

(22) Filed: May 27, 2014

(65) Prior Publication Data

US 2015/0185546 A1  Jul. 2, 2015

(30) Foreign Application Priority Data

Dec. 30, 2013  (KR) .......................... 10-2013-0167559

(51) Int. Cl.
   *G02F 1/1335* (2006.01)
   *G02F 1/13363* (2006.01)

(52) U.S. Cl.
   CPC .................... *G02F 1/13363* (2013.01); *G02F 2001/133567* (2013.01); *G02F 2001/133631* (2013.01); *G02F 2203/01* (2013.01); *G02F 2413/01* (2013.01)

(58) Field of Classification Search
   None
   See application file for complete search history.

(56) References Cited

U.S. PATENT DOCUMENTS

| | | | | |
|---|---|---|---|---|
| 6,002,518 A | * | 12/1999 | Faris | ............... G02B 27/0093 345/32 |
| 6,933,085 B1 | | 8/2005 | Talor | |
| 2008/0316413 A1 | | 12/2008 | Cho | |
| 2009/0021675 A1 | * | 1/2009 | Kishioka | ........... G02F 1/133555 349/106 |
| 2010/0033557 A1 | * | 2/2010 | Abe | ...................... G02B 27/26 348/58 |
| 2011/0261299 A1 | * | 10/2011 | Tai | ......................... G02B 27/26 349/98 |
| 2012/0147301 A1 | * | 6/2012 | Jeon | .................... G02B 27/2242 349/96 |
| 2012/0206512 A1 | | 8/2012 | Kim et al. | |
| 2012/0262638 A1 | * | 10/2012 | Chen | ...................... G02B 5/201 349/15 |

FOREIGN PATENT DOCUMENTS

KR  1020120038801 A  4/2012
KR    101150192 B1  5/2012

* cited by examiner

Primary Examiner — Ryan Crockett
(74) Attorney, Agent, or Firm — Cantor Colburn LLP

(57) ABSTRACT

A display panel includes: a plurality of pixels; and a first phase shifting layer and a second phase shifting layer, which overlap the pixels, where the first phase shifting layer and at least a portion of the second phase shifting layer are alternately arranged with each other, and a phase difference between light having a predetermined wavelength transmitted through the first phase shifting layer and light having the predetermined wavelength transmitted through the second phase shifting layer is approximately 180 degrees.

14 Claims, 24 Drawing Sheets

DISPLAY PANEL

This application claims priority to Korean Patent Application No. 10-2013-0167559 filed on Dec. 30, 2013, and all the benefits accruing therefrom under 35 U.S.C. §119, the content of which in its entirety is herein incorporated by reference.

BACKGROUND (a) Field

Exemplary embodiments of the invention relate to a display panel. More particularly, Exemplary embodiments of the invention relate to a transparent display panel with improved sharpness of a transmitted image of an external object viewed by light transmitted through the transparent display panel.

(b) Description of the Related Art

A display device, such as a liquid crystal display ("LCD"), an organic light emitting diode display and the like, generally includes a display panel including a plurality of pixels and a plurality of signal lines, and a driving unit for driving the display panel.

Each of the pixels includes a switching device connected to the signal line, a pixel electrode connected to the switching device, and an opposing electrode facing the pixel electrode. The pixel electrode is connected to a switching device, such as a thin film transistor ("TFT") or the like, to receive a data voltage applied thereto. The opposing electrode may be provided over an entire surface of the display panel, and may receive a common voltage applied thereto.

In such a display device, the pixel electrodes are mainly arranged regularly, and the switching devices such as the thin film transistors or the like connected to the pixel electrodes are also arranged regularly. For example, the pixel electrodes may be arranged substantially in a matrix form. The display panel further includes light blocking members covering spaces between the pixels and the thin film transistors to block light leakage. In a display device where the pixel electrodes and the switching devices are periodically arranged, the light blocking members covering the pixel electrodes and the switching devices may have a periodic form. For example, in a display device where the pixel electrodes are arranged substantially in the matrix form, the light blocking member covering the pixels may be formed substantially in a grating pattern.

In such a display device, each pixel may uniquely display one of primary colors or allows each pixel to alternately display the primary colors over time in order to implement a color display, such that desired colors are recognized by the spatial and temporal sum of the primary colors. In such a display device where each pixel uniquely displays one of the primary colors, each pixel may include a color filter that represents one of the primary colors in a region corresponding to the pixel electrode. The color filters may be regularly arranged along pixel columns or pixel rows.

The driving unit may include a data driver for applying a data voltage to the pixels and a gate driver for applying a gate signal that controls the transfer of the data voltage.

The LCD typically includes two substrates including the pixel electrodes and the counter electrodes disposed thereon, and a liquid crystal layer interposed between the two substrates and having dielectric anisotropy. The pixel electrodes may be arranged substantially in a matrix form and may be connected to the switching devices, such as the TFTs or the like, to sequentially receive the data voltage applied thereto row by row. The counter electrodes receive the common voltage applied thereto. The voltage is applied to the pixel electrodes and the counter electrodes to generate an electric field in the liquid crystal layer, and intensity of the electric field is controlled to control transmittance of light transmitted through the liquid crystal layer, thereby displaying a desired image.

The LCD may have lower side visibility than front visibility. In such a LCD, one pixel may be divided into two sub-pixels, which have different voltages, to improve the side visibility. In the LCD, each sub-pixel and each pixel may include a plurality of sub-regions in which liquid crystal molecules are inclined in different directions, to secure a wide viewing angle Recently, a display device including a transparent display panel, which transmits light from an external object when an image is displayed or is not, displayed has been developed. Since the transparent display panel may be maintained in a transparent state and may use ambient light when it does not display the image, it may decrease power consumption.

Generally, the transparent display panel may be manufactured by providing a transparent electronic device such as a thin film transistor or the like including a transparent material on a transparent substrate made of glass or the like.

The transparent display panel may be applied to a glass window, a front glass of a vehicle, or the like, to provide desired information to a user, or may be used in various fields such as an advertisement field, a promotion field, and the like.

SUMMARY

In a display panel, where the light blocking members, the color filters, or the thin film transistors that are periodically arranged form a grating pattern, e.g., an amplitude grating pattern, light transmitted through the display panel may be diffracted by the amplitude grating pattern.

In a liquid crystal display device in which each sub-pixel or each pixel includes the sub-regions, light transmitted through the display panel in adjacent sub-regions may be polarized in opposite directions. Therefore, a texture phenomenon may occur in the adjacent sub-regions. In such a liquid crystal display device, the sub-regions may form a phase grating pattern, and the light transmitted through the display panel may be diffracted by the phase grating pattern.

The diffraction grating pattern such as the amplitude grating pattern formed by several components of the display panel or the phase grating pattern as described above diffracts light from an external object positioned in a background of the transparent display panel when the light is transmitted through the transparent display panel, such that a transmitted image of the external object is blurred and sharpness and resolution thereof are deteriorated.

Exemplary embodiments of the invention has been made in an effort to provide a display panel, in which a transmitted image of an external object viewed by light transmitted through the display panel is sharply viewed.

An exemplary embodiment of the invention provides a display panel including: a plurality of pixels; and a first phase shifting layer and a second phase shifting layer, which overlap the pixels, where the first phase shifting layer and at least a portion of the second phase shifting layer are alternately arranged with each other, and a phase difference between light having a predetermined wavelength transmitted through the first phase shifting layer and light having the predetermined wavelength transmitted through the second phase shifting layer is approximately 180 degrees.

In an exemplary embodiment, the display panel may further include a light blocking member which blocks light leakage between the pixels, where the first phase shifting layer is disposed in a region corresponding to a first pixel among the pixels, and the second phase shifting layer is disposed in a region corresponding to a second pixel adjacent to the first pixel.

In an exemplary embodiment, each of the pixels may include first and second sub-pixels which display an image based on different gamma curves from each other, the first phase shifting layer may be disposed in a region corresponding to the first sub-pixel of a pixel of the pixels, and the second phase shifting layer may be disposed in a region corresponding to the second sub-pixel of the pixel and adjacent to the first sub-pixel of the pixel.

In an exemplary embodiment, the display panel may further include two substrates disposed opposite to each other, where the pixel may include a liquid crystal layer disposed between the two substrates and including a plurality of liquid crystal molecules, each of the pixels may include a plurality of sub-regions in which arrangement directions of the liquid crystal molecules are different from each other when an electric field is generated in the liquid crystal layer, the first phase shifting layer may be disposed in a region corresponding to a first sub-region among the sub-regions of a pixel of the pixels, and the second phase shifting layer may be disposed in a region corresponding to a second sub-region of the pixel and adjacent to the first sub-region of the pixel.

In an exemplary embodiment, a refractive index of the first phase shifting layer may be greater than a refractive index of the second phase shifting layer.

In an exemplary embodiment, the first and second phase shifting layers may be disposed in a same layer and have substantially the same thickness as each other.

In an exemplary embodiment, at least one of the first and second phase shifting layers may include a transparent inorganic material including $ZrO_x$, $TiO_2$, $SiN_x$, $SiO_x$ or $MgF_3$, or a transparent organic material.

In an exemplary embodiment, a portion of the second phase shifting layer may cover the first phase shifting layer.

In an exemplary embodiment, the first phase shifting layer may include a transparent inorganic material including $ZrO_x$, $TiO_2$, $SiN_x$, $SiO_x$ or $MgF_3$, or a transparent organic material.

In an exemplary embodiment, the display panel may further include a light blocking member which blocks light leakage between the first sub-pixel and the second sub-pixel of the pixel.

According to exemplary embodiments of the invention, a transmitted image of an external object viewed by light transmitted through the display panel may be sharply viewed.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION

Figure 1:
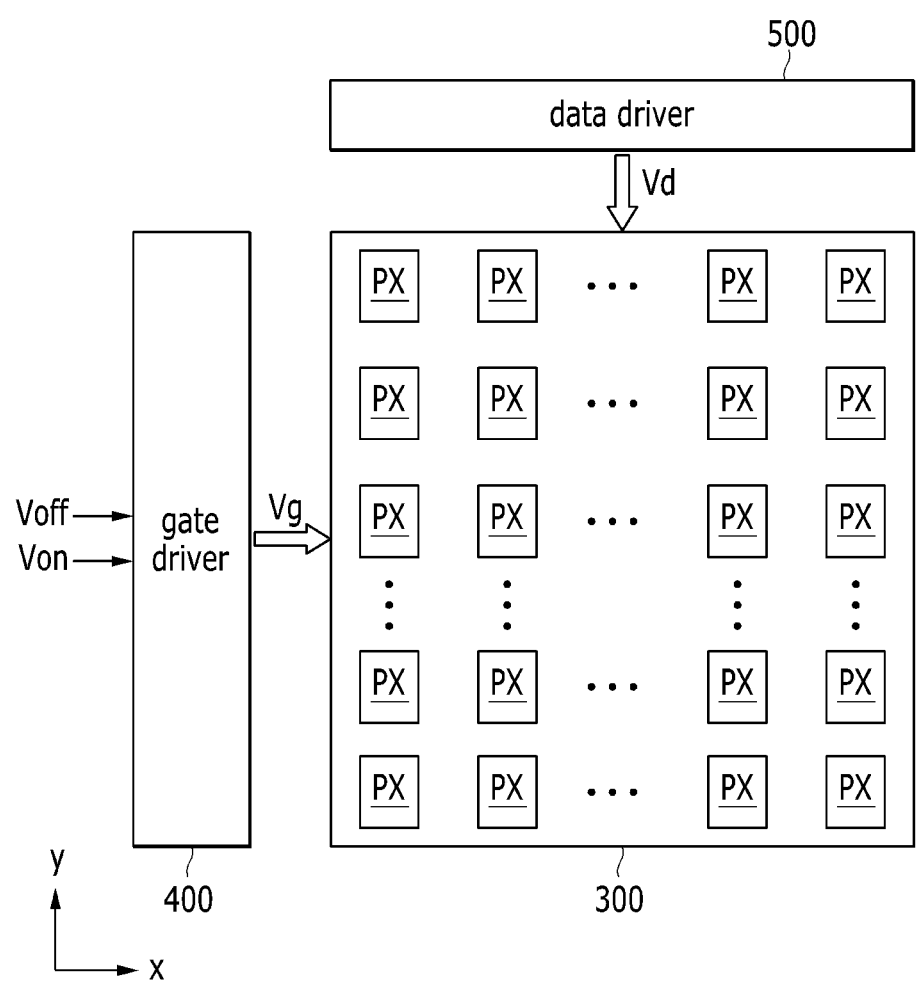
FIG. 1 is a block diagram of an exemplary embodiment of a display device including a display panel, according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of a display panel and a display device including such a display panel, according to the invention, will be described in detail with reference to the accompanying drawings.

First, an exemplary embodiment of a display device according to the invention will be described with reference to FIGS. 1 to 5.

Figure 2:
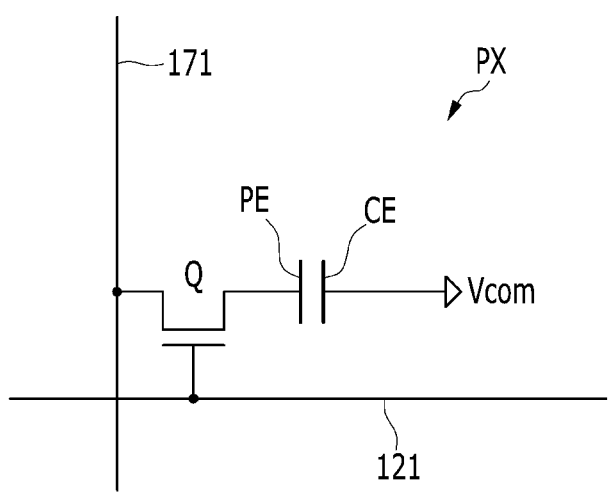
FIG. 2 is a schematic circuit diagram of a pixel of an exemplary embodiment of the display device including the display panel, according to the invention.
Figure 3:
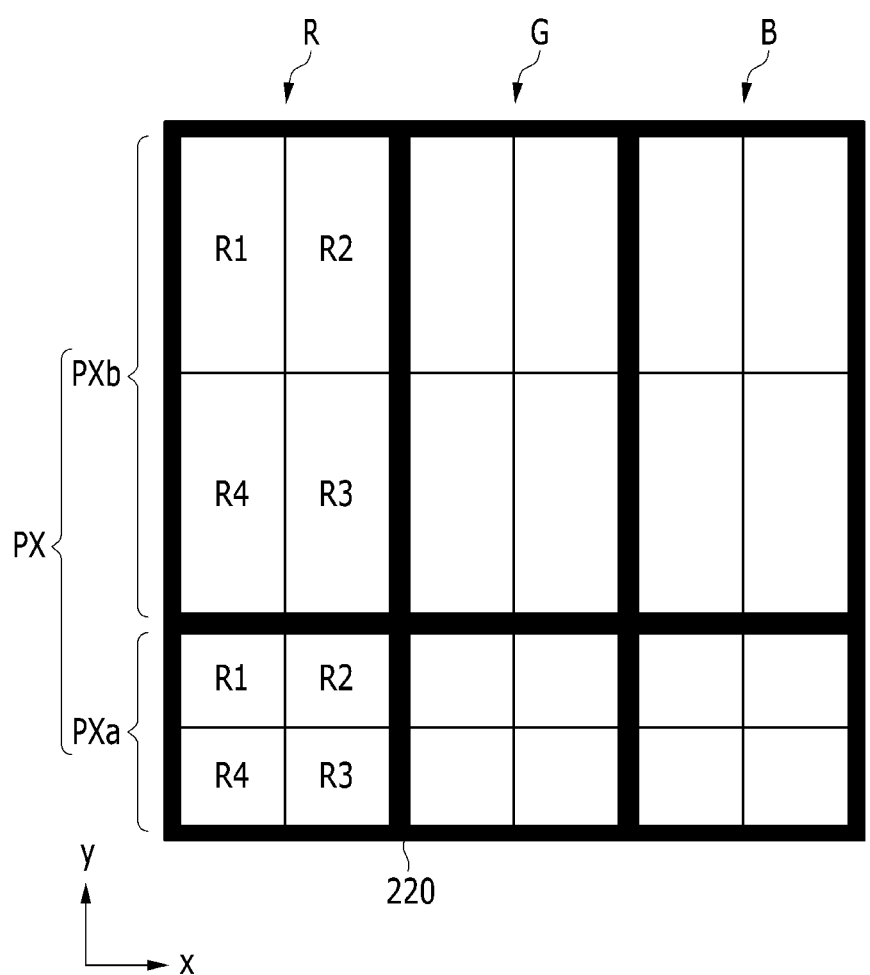
FIGS. 3 and 4 are layout diagrams of a plurality of pixels in an exemplary embodiment of the display panel according to the invention.
Figure 4:
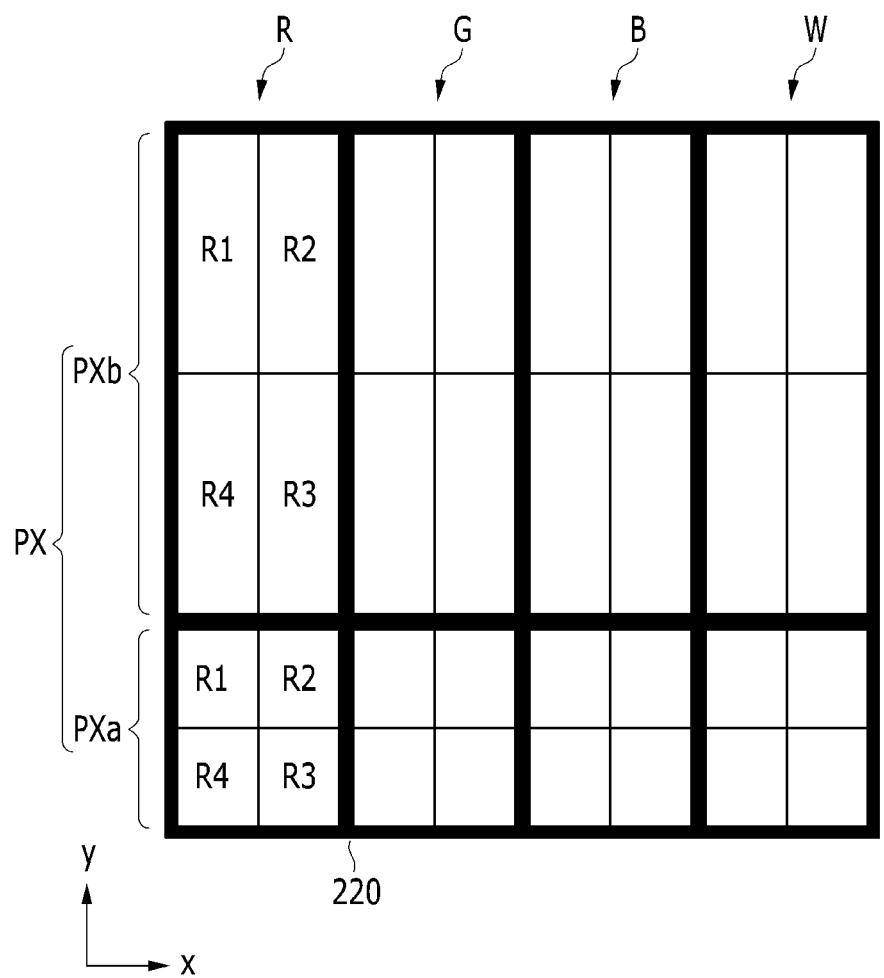
Figure 5:
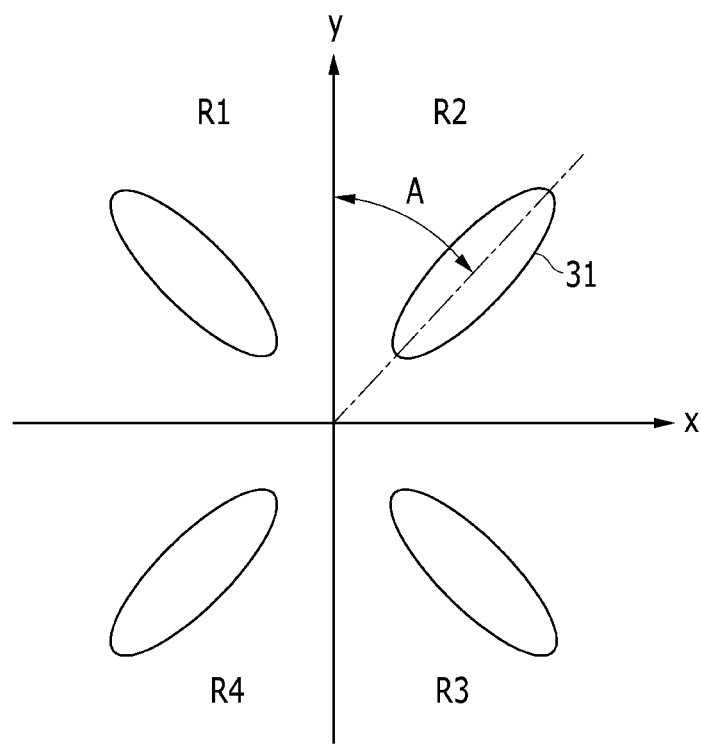
FIG. 5 is a diagram showing a direction in which liquid crystal molecules are inclined in a plurality of sub-regions in a pixel of an exemplary embodiment of the display panel according to the invention.

FIG. 1 is a block diagram showing an exemplary embodiment of a display device including a display panel, according to the invention, FIG. 2 is a schematic circuit diagram of a pixel of an exemplary embodiment of the display device including the display panel, according to the invention, FIGS. 3 and 4 are layout diagrams of a plurality of pixels in an exemplary embodiment of the display panel according to the invention, and FIG. 5 is a diagram showing a direction in which liquid crystal molecules are inclined in a plurality of sub-regions in a pixel of an exemplary embodiment of the display panel according to the invention.

Referring to FIG. 1, an exemplary embodiment of a display device according to the invention includes a transparent display panel 300, a gate driver 400, and a data driver 500.

In such an embodiment, where the display panel 300 is transparent, light from an external object positioned in a background (a rear side of the display panel 300) is transmitted through the display panel, such that the external object may be viewed by an observer positioned in front of the display panel 300.

The display panel 300 includes a plurality of signal lines and a plurality of pixels PX connected to the plurality of signal lines, respectively. The plurality of pixels PX may be arranged in an approximately matrix form, but are not limited thereto. A row direction is denoted by an x direction, while a column direction is denoted by a y direction.

The signal lines include a plurality of gate lines (not shown) that transfers a gate signal Vg and a plurality of data lines (not shown) that transfers a data voltage Vd. The gate lines may extend approximately in the x direction, and the data line may extend approximately in the y direction.

Each of the pixels PX may display one of primary colors. In an exemplary embodiment, each pixel PX unique displays one of the primary colors (spatial division) or alternately displays the primary colors over time (time division), such that desired colors may be recognized by a spatial or temporal sum of these primary colors. In one exemplary embodiment, for example, the primary colors may include three primary colors such as red R, green G, and blue B. In an alternative exemplary embodiment, the primary colors may include four primary colors, or the like. In such an embodiment, each pixel PX may include a color filter that represents each primary color or may receive light of each primary color to display a color.

Referring to FIG. 2, in an exemplary embodiment, a pixel PX in the display device may include a switching device Q connected to a corresponding data line 171 and a corresponding gate line 121, a pixel electrode PE connected to the switching device Q, and an opposing electrode CE that is disposed opposite to the pixel electrode PE and receives a common voltage Vcom applied thereto. The switching device Q may include a thin film transistor. Herein, the thin film transistor and the switching device will be denoted by the same reference character. The switching device Q may be controlled by a gate signal transferred by the gate line 121 to transfer a data voltage transferred by the data line 171 to the pixel electrode PE.

In an exemplary embodiment, where the display is a liquid crystal display, a pixel PX thereof may include lower and upper display panels (not shown) facing each other, and a liquid crystal layer (not shown) interposed between the lower and upper display panels, in a cross-sectional structure.

In an exemplary embodiment, referring to FIG. 3, a plurality of pixels PX in the display device may represent a plurality of primary colors, for example, red R, green G and blue B. A pixel representing the red R is referred to as a red pixel, a pixel representing the green G is referred to as a green pixel, and a pixel representing the blue B is referred to as a blue pixel. The pixels representing a same primary color may be arranged along a same direction, for example, the y direction. In such an embodiment, pixel arrays of the respective primary colors may be alternately arranged in the x direction.

In an alternative exemplary embodiment, referring to FIG. 4, the plurality of pixels PX in the display device may further include a pixel representing an additional primary color other than the red R, the green G, and the blue B. In one exemplary embodiment, for example, as shown in FIG. 4, the pixel representing the additional primary color may be a white pixel representing white W. In such an embodiment, transmittance and luminance of the display device may be further increased by the white pixel. In such an embodiment, the pixels representing the respective primary colors including the white may be arranged in a predetermined direction, for example, the y direction. In such an embodiment, pixel arrays of the respective primary colors may be alternately arranged in the x direction.

The pixels PX may include color filters representing the color thereof. The color filter may extend along the pixel arrays of the corresponding primary color, e.g., the y direction.

Referring to FIGS. 3 and 4, in an exemplary embodiment, light blocking members 220 may be disposed between the pixels PX. The light blocking members 220 may be referred to as black matrices, and may block light leakage between the pixels PX. Opening parts of the pixels PX, that is, transmission regions in which an image is displayed or through which light is transmitted, are defined by the light blocking members 220. The respective transmission regions may be enclosed by the light blocking members 220. In such an embodiment, the light blocking members 220 may further include a part corresponding to the thin film transistor Q.

In an exemplary embodiment, where each pixel PX include a color filter, most of the color filters may be disposed in regions enclosed by the light blocking members 220, that is, the transmission regions, but the invention is not limited thereto.

Referring to FIGS. 3 and 4, each pixel PX may include a first sub-pixel PXa and a second sub-pixel PXb. The first sub-pixel PXa and the second sub-pixel PXb may display images based on different gamma curves or display an image based on the same gamma curve, with respect to a same image signal. Areas of the first sub-pixel PXa and the second sub-pixel PXb may be substantially the same as or different from each other. In one exemplary embodiment, for example, luminance of an image displayed by the first sub-pixel PXa is higher than luminance of an image displayed by the second sub-pixel PXb, and an area of the first sub-pixel PXa may be smaller than an area of the second sub-pixel PXb.

In an exemplary embodiment, the first sub-pixel PXa and the second sub-pixel PXb may be arranged in each pixel in the y direction. In such an embodiment, the light blocking member 220 may be disposed between the first sub-pixel PXa and the second sub-pixel PXb to block the leakage of the light.

In such an embodiment, the light blocking members 220, the color filters, the signal lines such as the gate lines 121 and the data lines 171 and the like, which are periodically arranged in the display panel 300, form a grating pattern, e.g., an amplitude grating pattern, such that light transmitted through the display panel 300 may be diffracted by the amplitude grating pattern.

Referring to FIGS. 3 and 4, at least one of the first sub-pixel PXa and the second sub-pixel PXb may include a plurality of sub-regions R1 to R4. The number of the sub-regions R1 to R4 included in the first sub-pixel PXa or the second sub-pixel PXb may be four, but is not limited thereto.

Referring to FIG. 5, in an exemplary embodiment where each pixel PX of the display device includes a liquid crystal layer, when an electric field is generated in the liquid crystal layer, arrangement directions of liquid crystal molecules 31 in adjacent sub-regions R1 to R4 may be different from each other. The arrangement directions of the liquid crystal molecules 31 in the adjacent sub-regions R1 to R4 may be approximately perpendicular to each other. An angle A formed between a direction in which longitudinal axes of the liquid crystal molecules 31 are inclined in the respective sub-regions R1 to R4 and the x direction or the y direction may be approximately 45 degrees, but is not limited thereto.

In such an embodiment where a pixel PX includes the plurality of sub-regions R1 to R4 described above, directions in which the liquid crystal molecules 31 are inclined in the pixel PX become various, such that a reference viewing angle of the display device may be increased.

In such an embodiment, where the arrangement directions of the liquid crystal molecules 31 in the adjacent sub-regions R1 to R4 are different from each other, polarization directions of light transmitted through the liquid crystal layer may become different from each other, and a texture phenomenon, in which arrangements of the liquid crystal molecules 31 between the sub-regions R1 to R4 are not substantially controlled, may occur. Therefore, in such an embodiment, the plurality of sub-regions R1 to R4 may form a phase grating pattern, and light transmitted through the display panel 300 may be diffracted.

In an exemplary embodiment, the diffraction grating pattern such as the amplitude grating pattern formed by various components of the display panel 300, for example, the light blocking members 220, the color filters, the thin film transistors and the like, or the phase grating pattern formed by the sub-regions R1 to R4 described above, diffracts the light from the external object positioned in the background of the transparent display panel 300, such that a transmitted image of the external object viewed by the light transmitted through the display panel 300 is blurred, thereby deteriorating sharpness of the transmitted image.

Accordingly, in an exemplary embodiment of the invention, phases of light transmitted through adjacent pixels PX, adjacent sub-pixels PXa and PXb or adjacent sub-regions R1 to R4 in the display panel 300 are shifted to be different from each other, such that destructive interference of the light diffracted while being transmitted through the adjacent pixels PX, the adjacent sub-pixels PXa and PXb or the adjacent sub-regions R1 to R4 may occur in regions between the adjacent pixels PX, the adjacent sub-pixels PXa and PXb or the adjacent sub-regions R1 to R4. Therefore, in such an embodiment, intensity of the light transmitted through the regions between the adjacent pixels PX, the adjacent sub-pixels PXa and PXb, or the adjacent sub-regions R1 to R4 may be substantially reduced such that blurring of the transmitted image of the external object viewed through the transparent display panel 300 may be decreased, and the transmitted image of the external object may be sharply viewed. In such an embodiment, a phase difference of the light transmitted through the adjacent pixels PX, the adjacent sub-pixels PXa and PXb or the adjacent sub-regions R1 to R4 may be approximately 180 degrees to generate effective destructive interference.

Next, a detailed structure of an exemplary embodiment of a display panel in the display device will be described with reference to FIGS. 6 to 9 together with FIGS. 1 to 5. The same or like elements shown in FIGS. 6 to 9 have been labeled with the same reference characters as used above to describe the exemplary embodiments of the display device shown in FIGS. 1 to 5, and any repetitive detailed description thereof will hereinafter be omitted or simplified.

Figure 6:
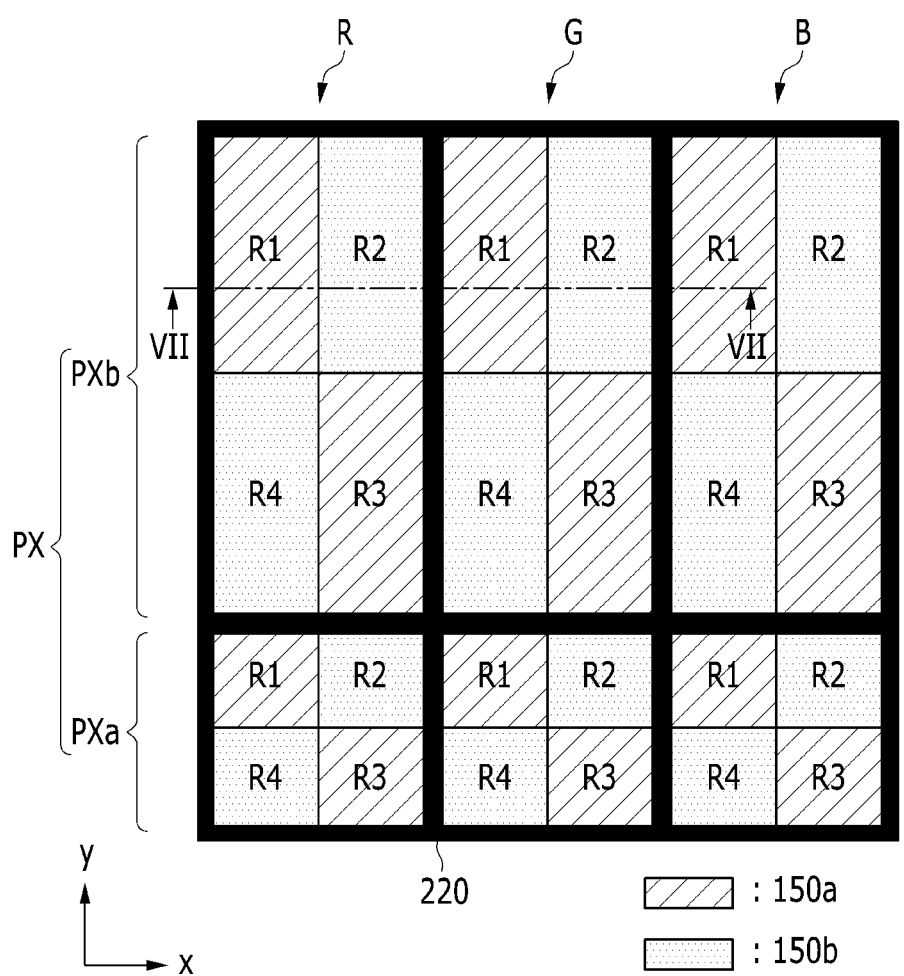
FIG. 6 is a layout diagram of a plurality of pixels in an exemplary embodiment of a display panel according to the invention.
Figure 7:
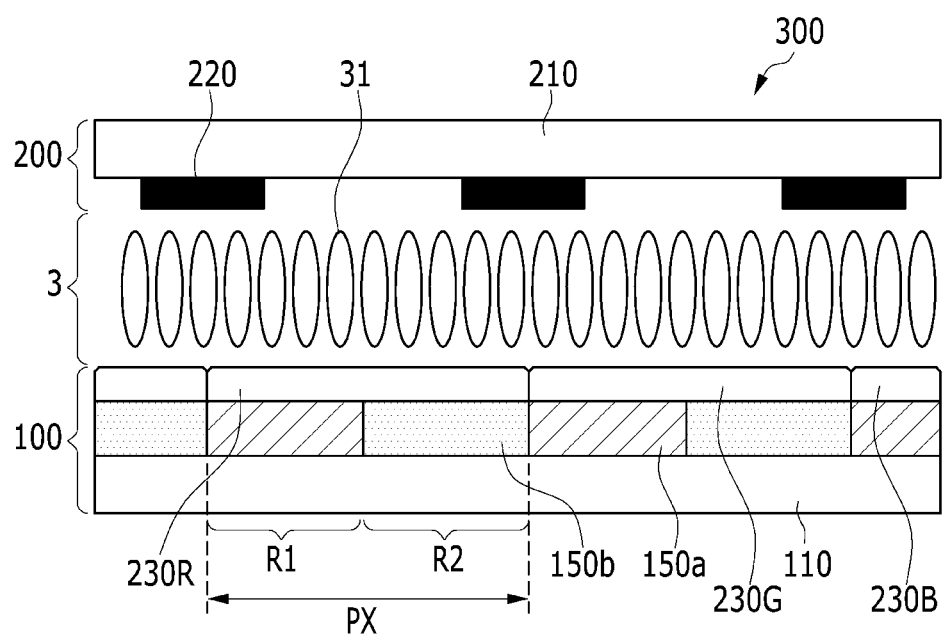
FIG. 7 is a cross-sectional view taken along line VII-VII of the display panel shown in FIG. 6.
Figure 8:
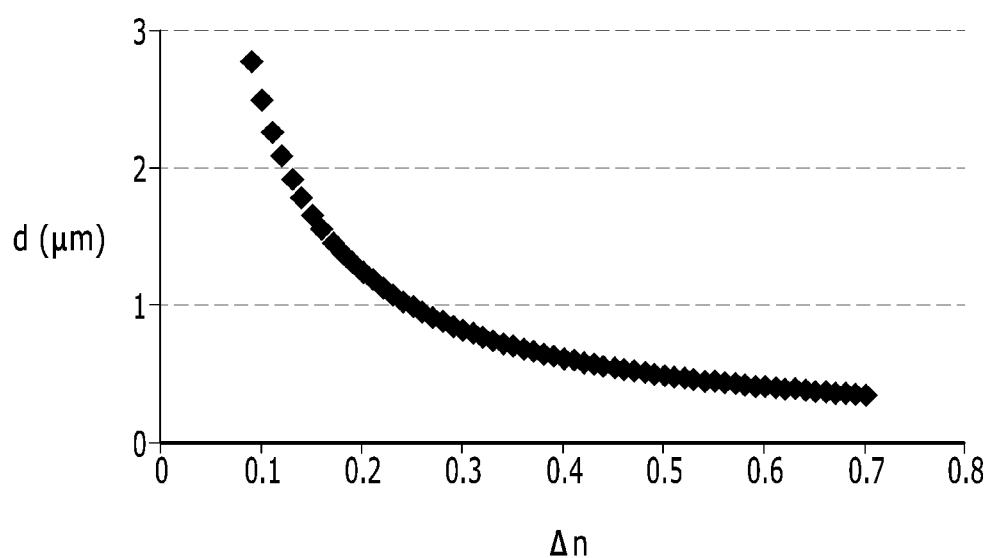
FIG. 8 is a graph of thickness of a phase shifting layer versus difference in refractive index between different phase shifting layers in an exemplary embodiment of the display panel according to the invention.

FIG. 6 is a layout diagram of a plurality of pixels in an exemplary embodiment of a display panel according to the invention, FIG. 7 is a cross-sectional view taken along line VII-VII of the display panel shown in FIG. 6, and FIG. 8 is a graph of thickness of phase shifting layers versus difference in a refractive index between different phase shifting layers in an exemplary embodiment of the display panel, which is transparent, according to the invention.

The display panel 300 shown in FIG. 6 is substantially the same as the display panel shown in FIG. 3. In an exemplary embodiment, as shown in FIG. 6, the display panel 300 may include a first phase shifting layer 150a and a second phase shifting layer 150b, which allow phases of light transmitted through adjacent pixels PX, adjacent sub-pixels PXa and PXb, and adjacent sub-regions R1 to R4 to be different from each other.

A difference between a phase shift of the light transmitted through the first phase shifting layer 150a and a phase shift of the light transmitted through the second phase shifting layer 150b, that is, a phase difference, may be approximately 180 degrees. In such an embodiment, a refractive index n1 of the first phase shifting layer 150a and a refractive index n2 of the second phase shifting layer 150b may be different from each other.

The first phase shifting layer 150a and the second phase shifting layer 150b may include a transparent inorganic material such as $ZrO_x$, $TiO_2$, $SiN_x$, $SiO_x$, $MgF_3$ or the like, or a transparent organic material. The first phase shifting layer 150a and the second phase shifting layer 150b may include the same material or different materials. In one exemplary embodiment, for example, the first shifting layer 150a may include a silicon oxide ($SiO_x$), and the second phase shifting layer 150b may include a material different from the silicon oxide ($SiO_x$), for example, a silicon nitride ($SiN_x$).

Refractive indices of materials including same elements may be controlled to be different from each other based on, e.g., by controlling, an element ratio of the elements in the materials. In one exemplary embodiment, for example, the silicon nitride may have a refractive index of approximately 1.5 to 2.4 based on an element ratio thereof. In one exemplary embodiment, for example, the first phase shifting layer 150a and the second phase shifting layer 150b may include a silicon nitride having a refractive index of approximately 2.4 and a silicon oxide having a refractive index of approximately 1.5, respectively.

A thickness d of the first phase shifting layer 150a and the second phase shifting layer 150b, a refractive index n1 of the first phase shifting layer 150a, and a refractive index n2 of the second phase shifting layer 150b may satisfy the following Equation 1.

$$\Delta\phi = 2\pi \times |n1-n2| \times d/\lambda = 180° \quad \text{Equation 1}$$

In Equation 1, $\Delta\phi$ denotes a phase difference between the first phase shifting layer 150a and the second phase shifting layer 150b, d denotes a thickness of the first phase shifting layer 150a and the second phase shifting layer 150b, and $\lambda$ denotes a wavelength of the transmitted light.

In an exemplary embodiment of a display device including a red pixel, a green pixel and a blue pixel, $\lambda$ may be set to a wavelength of green light. In an alternative exemplary embodiment of the invention, thicknesses d of the first phase shifting layer 150a and the second phase shifting layer 150b in the pixels may be different from each other based on wavelengths of corresponding primary colors thereof in the display panel 300. In another alternative exemplary embodiment of the invention, differences ($\Delta n=|n1-n2|$) in a refractive index between the first phase shifting layer 150a and the second phase shifting layer 150b in the pixels may be different from each other based on wavelengths of corresponding primary colors thereof in the display panel 300, while maintaining the thicknesses d of the first phase shifting layer 150a and the second phase shifting layer 150b constant, e.g., to be substantially the same as each other.

In one exemplary embodiment, for example, where the wavelength of the transmitted light ($\lambda$) is approximately 0.5 micrometer ($\mu m$), when a refractive index n1 of the first phase shifting layer 150a is in a range of approximately 1.8 to approximately 1.9, and a refractive index n2 of the second phase shifting layer 150b is in a range of approximately 1.4 to approximately 1.5, a thickness d of the first phase shifting layer 150a and the second phase shifting layer 150b for generating destructive interference may be in a range of approximately 0.5 $\mu m$ to approximately 0.7 $\mu m$ based on the Equation 1 described above.

Referring to FIG. 8, as the difference ($\Delta n=|n1-n2|$) in the refractive index between the first phase shifting layer 150a and the second phase shifting layer 150b is increased, the thickness d of the first phase shifting layer 150a and the second phase shifting layer 150b satisfying the above Equation 1 is decreased. Therefore, in an exemplary embodiment, the thickness of the first phase shifting layer 150a and the second phase shifting layer 150b may be determined based on the difference ($\Delta n$) in the refractive index between the first phase shifting layer 150a and the second phase shifting layer 150b.

Referring to FIG. 6, in an exemplary embodiment, the first phase shifting layer 150a and the second phase shifting layer 150b that are different from each other may be disposed, respectively, in the adjacent sub-regions R1 to R4 in the respective sub-pixels PXa and PXb to generate destructive interference of light in regions between the adjacent sub-regions R1 to R4. In such an embodiment, the first phase shifting layer 150a and the second phase shifting layer 150b that are different from each other may also be disposed, respectively, in the adjacent sub-regions R1 to R4 between the adjacent sub-pixels PXa and PXb to generate destructive interference of light in regions between the adjacent sub-regions R1 to R4.

Referring to FIGS. 6 and 7, the display panel 300 includes lower and upper display panels 100 and 200, which are liquid crystal panels, facing each other, and a liquid crystal layer 3 interposed between the lower and upper display panels 100 and 200.

The liquid crystal layer 3 includes a plurality of liquid crystal molecules 31. The liquid crystal molecules 31 may be oriented substantially perpendicular to surfaces of the lower and upper display panels 100 and 200 as shown in FIG. 7, or may be oriented substantially parallel thereto.

The lower display panel 100 includes a transparent substrate 110. In such an embodiment, the first phase shifting layers 150a and the second phase shifting layers 150b may be disposed in various layers above or below the substrate 110. FIG. 7 shows an exemplary embodiment in which the first phase shifting layers 150a and the second phase shifting layers 150b are disposed on the substrate 110. The first phase shifting layers 150a and the second phase shifting layers 150b may be alternatively disposed in a same layer.

The first phase shifting layers 150a and the second phase shifting layers 150b are disposed in the sub-regions R1 to R4, respectively, and may be disposed adjacent to each other in a pixel PX.

A plurality of color filters 230R, 230G and 230B may be disposed on or beneath the first phase shifting layers 150a and the second phase shifting layers 150b. In an exemplary embodiment, as shown in FIG. 7, the plurality of color filters 230R, 230G and 230B are disposed on the first phase shifting layers 150a and the second phase shifting layers 150b.

In an exemplary embodiment, as shown in FIG. 7, the upper display panel 200 may include a transparent substrate 210 on which light blocking members 220 are disposed. In an alternative exemplary embodiment, the light blocking members 220 may be disposed in the lower display panel 100, along with the color filters 230R, 230G and 230B. In an alternative exemplary embodiment, the color filters 230R, 230G and 230B may be positioned in the upper display panel 200.

According to another exemplary embodiment of the invention, the first phase shifting layers 150a and the second phase shifting layers 150b may be disposed at various layers above or below the transparent substrate 210 of the upper display panel 200.

Figure 9:
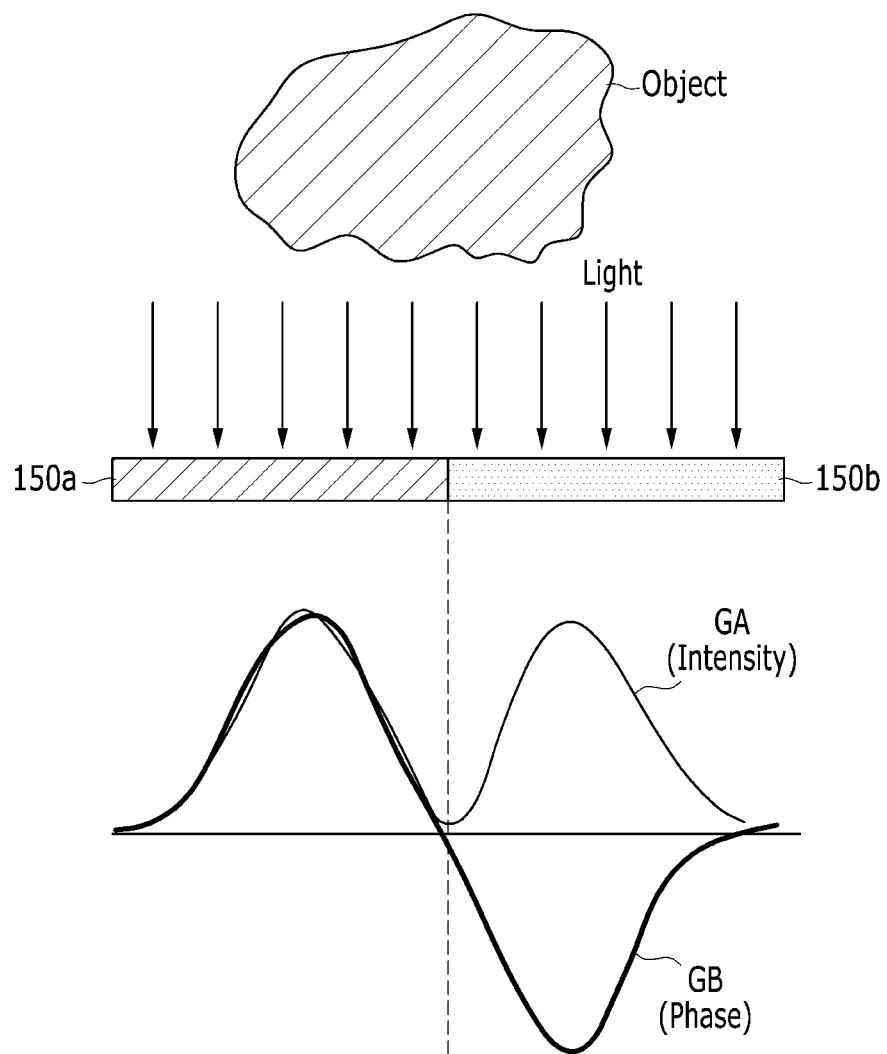
FIG. 9 shows curves showing intensity and a phase of light from an external object, transmitted through an exemplary embodiment of the display panel according to the invention.

FIG. 9 shows a curve GA showing intensity and a curve GB showing a phase of light from an external object, transmitted through an exemplary embodiment of the display panel according to the invention.

Referring to FIG. 9, according to an exemplary embodiment of the invention, when light from an external object positioned in a background of the display panel 300 is transmitted through the adjacent first phase shifting layer 150a and second phase shifting layers 150b of the display panel 300, a phase difference of the light becomes approximately 180 degrees, such that destructive interference of the light between the adjacent sub-regions R1 to R4 may occur. Therefore, intensity of the light in regions between the adjacent sub-regions R1 to R4 is substantially reduced, such that a transmitted image of the external object viewed by the light transmitted through the display panel 300 may be sharply viewed.

Next, a structure of a pixel of an exemplary embodiment of the display device according to the invention will be described with reference to FIGS. 10 and 11 together with FIGS. 6 to 9 described above.

Figure 10:
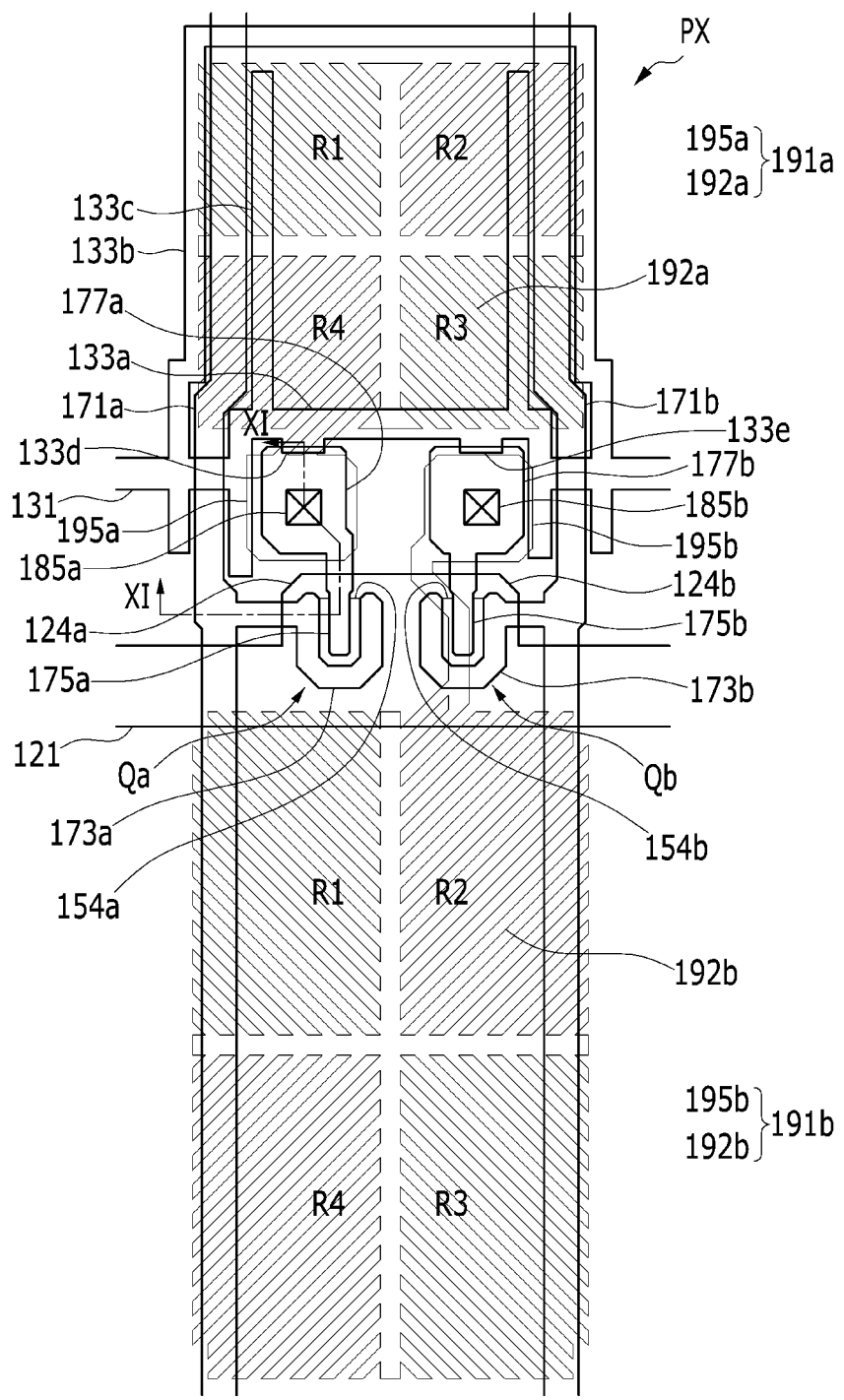
FIG. 10 is a plan view of a pixel in an exemplary embodiment of the display panel according to the invention.
Figure 11:
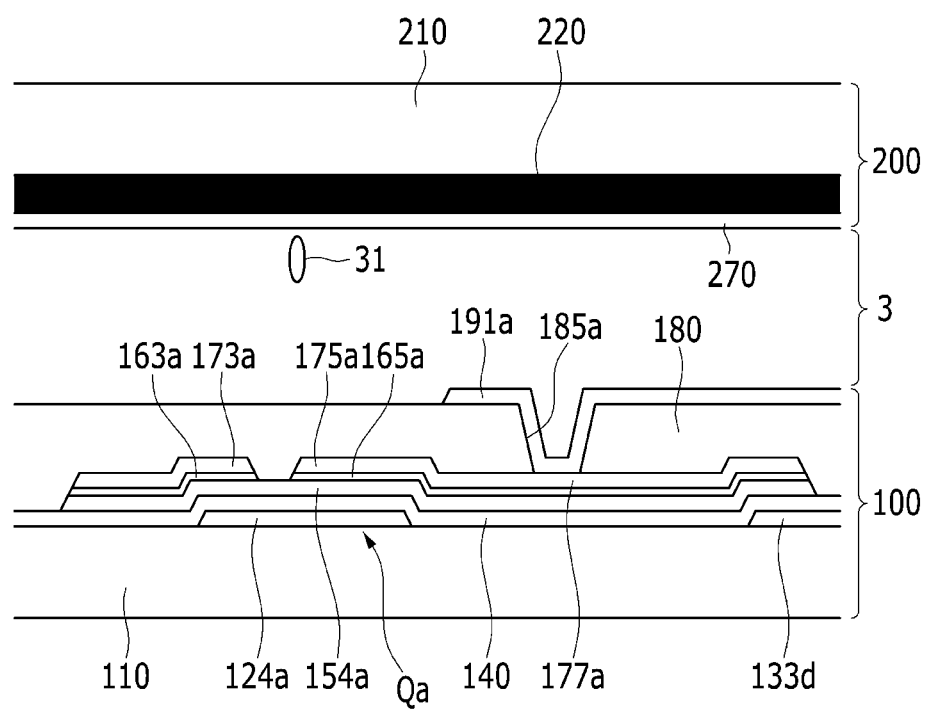
FIG. 11 is a cross-sectional view taken along line XI-XI of the display panel shown in FIG. 10.

FIG. 10 is a plan view of a pixel in an exemplary embodiment of the display panel according to the invention, and FIG. 11 is a cross-sectional view taken along line XI-XI of the display panel shown in FIG. 10.

In an exemplary embodiment, where the display device is a liquid crystal display, a display panel 300 includes lower and upper display panels 100 and 200 facing each other, and a liquid crystal layer 3 interposed between the lower and upper display panels 100 and 200.

The lower display panel 100 includes a transparent substrate, and further includes, a gate line 121 and a sustain electrode line 131, which are disposed on the transparent substrate 110.

The gate line 121 extends substantially in a horizontal direction, and includes a first gate electrode 124a and a second gate electrode 124b.

The sustain electrode line 131 may include a horizontal part extending substantially in the horizontal direction and a plurality of sustain electrodes, a first sustain electrode 133a, a second sustain electrode 133b and a third sustain electrode 133c, extending from the horizontal part. The first sustain electrode 133a may protrude upwardly from the horizontal part of the sustain electrode line 131 and then extend in the horizontal direction, and the second sustain electrode 133b may extend upwardly from the horizontal part and then extend in the horizontal direction at an upper portion of the pixel PX. The third sustain electrode 133c may extend upwardly from the first sustain electrode 133a. The second sustain electrode 133b and the third sustain electrode 133c may extend substantially parallel to each other. Portions of the first sustain electrode 133a may define fourth and fifth sustain electrodes 133d and 133e.

A gate insulating layer 140 is disposed on the gate line 121 and the sustain electrode line 131, and a first semiconductor 154a and a second semiconductor 154b are disposed on the gate insulating layer 140. The first and second semiconductors 154a and 154b may include a crystalline silicon semiconductor, an amorphous silicon semiconductor, an oxide semiconductor, or the like, for example.

Ohmic contacts 163a and 165a are disposed on the first and second semiconductors 154a and 154b, respectively. The ohmic contacts 163a and 165a may include a material such as n+ hydrogenated amorphous silicon, on which an n-type impurity such as phosphorus is doped at a high concentration, or a silicide. The ohmic contacts 163a and 165a may be disposed as a pair on each semiconductor layer 154a or 154b. In an exemplary embodiment, the semiconductor layers 154a or 154b may include an oxide semiconductor, and the ohmic contacts 163a and 165a may be omitted.

A data conductor, including a first data line 171a, a second data line 171b, a first drain electrode 175a and a second drain electrode 175b, may be disposed on the ohmic contacts 163a and 165b, and the gate insulating layer 140.

The first and second data lines 171a and 171b may extend substantially in the vertical direction and parallel to each other. The first and second data lines 171a and 171b include first and second source electrodes 173a and 173b extending toward the first and second gate electrodes 124a and 124b, respectively. The first and second data lines 171a and 171b may extend substantially in the vertical direction between first and third the sustain electrodes 133a and 133c adjacent to each other.

The first drain electrode 175a may include an end portion facing the first source electrode 173a and an extension part 177a having an expanded or wide area for connection to another layer. The second drain electrode 175b may include an end portion facing the second source electrode 173b and an extension part 177b having an expanded or wide area for connection to another layer.

The first and second gate electrodes 124a and 124b, the first and second source electrodes 173a and 173b, and the first and second drain electrode 175a and 175b form or collectively define first and second thin transistors Qa and Qb, together with the first and second semiconductor 154a and 154b, respectively.

A passivation layer 180 is disposed on the first and second thin film transistors Qa and Qb. First and second contact holes 185a and 185b are defined or formed through the passivation layer 180 to expose the first and second drain electrodes 175a and 175b.

A pixel electrode is disposed on the passivation layer 180. The pixel electrode may include a first sub-pixel electrode 191a and a second sub-pixel electrode 191b. The first sub-pixel electrode 191a includes a cross-shaped stem part, a plurality of branch electrodes 192a extending outwardly from the cross-shaped stem part, and an extension part 195a for connection to another layer. The second sub-pixel electrode 191b includes a cross-shaped stem part, a plurality of branch electrodes 192b extending outwardly from the cross-shaped stem part, and an extension part 195b for connection to another layer.

The first and second sub-pixel electrodes 191a and 191b may be divided into a plurality of regions R1 to R4 based on an extending direction of the branch electrodes 192a and 192b of the first and second sub-pixel electrodes 191a and 191b.

As described above, in such an embodiment, the first phase shifting layers 150a and the second phase shifting layers 150b that are different from each other may be disposed in the adjacent sub-regions R1 to R4, respectively. In one exemplary embodiment, for example, the first phase shifting layers 150a and the second phase shifting layers 150b may be disposed between the first and second thin film transistors Qa and Qb or be disposed on the first and second thin film transistors Qa and Qb. In an exemplary embodiment where the first phase shifting layers 150a and the second phase shifting layers 150b are disposed on the first and second thin film transistors Qa and Qb, the passivation layer 180 may be omitted. In one exemplary embodiment, for example, the first phase shifting layers 150a and the second phase shifting layers 150b may be disposed in a space that is typically occupied by the passivation layer 180.

The first and second sub-pixel electrodes 191a and 191b may be disposed at upper and lower portions, respectively, with the gate line 121 being interposed therebetween. The first sub-pixel electrode 191a may have a smaller area than the second sub-pixel electrode 191b.

The first sub-pixel electrode 191a may receive a data voltage applied from the first drain electrode 175a through the first contact hole 185a, and the second sub-pixel electrode 191b may receive a data voltage applied from the second drain electrode 175b through the second contact hole 185b.

The first and second sub-pixel electrodes 191a and 191b may include or be made of a transparent conductive material such as indium tin oxide ("ITO"), indium zinc oxide ("IZO"), or the like.

In an exemplary embodiment, as shown in FIG. 11, the upper display panel 200 includes a transparent substrate 210, the light blocking member 220 and an opposing electrode 270. In such an embodiment, the light blocking member 220 may be disposed on the transparent substrate 210, and the opposing electrode 270 may be disposed on the substrate 210. The opposing electrode 270 may include or be made of a transparent conductor such as ITO, IZO, etc., a metal, or the like.

According to another exemplary embodiment of the invention, the first phase shifting layers 150a and the second phase shifting layers 150b may be disposed on or beneath the substrate 210 of the upper display panel 200. In one exemplary embodiment, for example, the first phase shifting layers 150a and the second phase shifting layers 150b may be disposed on an upper surface of the substrate 210, be disposed between the substrate 210 and the light blocking member 220, or be disposed beneath the light blocking member 220.

The liquid crystal layer 3 may include liquid crystal molecules 31 having dielectric anisotropy, wherein the liquid crystal molecules 31 may be oriented in predetermined directions such that longitudinal axis thereof may be substantially perpendicular to a surface of the lower and upper display panels 100 and 200 in a state in which an electric field is not generated therebetween. The liquid crystal molecules 31 of the liquid crystal layer 3 may be pre-tilted such that the longitudinal axis of a liquid crystal molecule 31 is aligned to be substantially parallel to a length direction (or extending direction) of a corresponding branch electrode 192a and 192b of the first and second sub-pixel electrodes 191a and 191b.

Next, an exemplary embodiment of a method of manufacturing a display panel, according to the invention, will be described with reference to FIGS. 12 to 16 together with FIGS. 6 to 7 described above.

FIGS. 12 to 16 are cross-sectional views showing an exemplary embodiment of a method of manufacturing a display panel, according to the invention.

Figure 12:
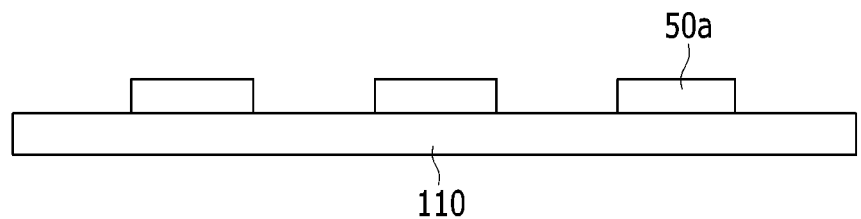
FIGS. 12 to 16 are cross-sectional views showing manufacturing an exemplary embodiment of a method of manufacturing a display panel, according to the invention.

In an exemplary embodiment, referring to FIG. 12, a first photosensitive film pattern 50a is provided, e.g., formed, on a transparent substrate 110 using a photolithography process. In such an embodiment, a plurality of openings are defined by the first photosensitive film pattern 50a.

Figure 13:
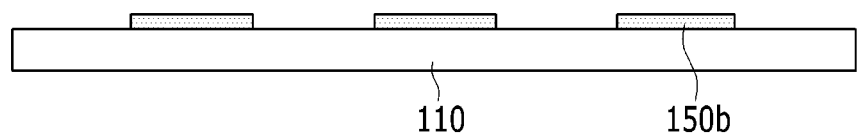

Next, referring to FIG. 13, a transparent inorganic material, such as $ZrO_x$, $TiO_2$, $SiNx$, $SiO_x$, $MgF_3$ or the like, or a transparent organic material is deposited on the opening of the photosensitive film pattern 50a to provide the second phase shifting layer 150b that is patterned. Then, the first photosensitive film pattern 50a is removed.

Figure 14:
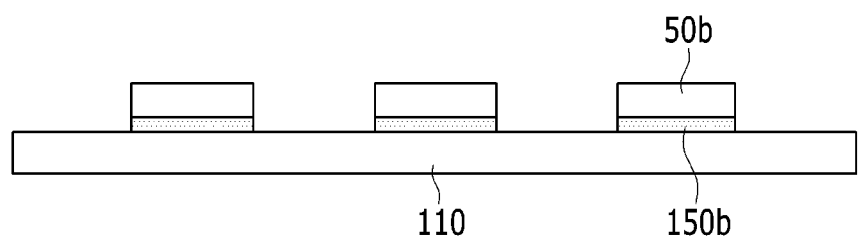

Next, referring to FIG. 14, a second photosensitive film pattern 50b that is patterned is provided, e.g., formed, on the second phase shifting layer 150b using a photolithography process. In such an embodiment, a plurality of openings that exposes the transparent substrate 110 is defined by the second photosensitive film pattern 50b and the second phase shifting layer 150b.

Figure 15:
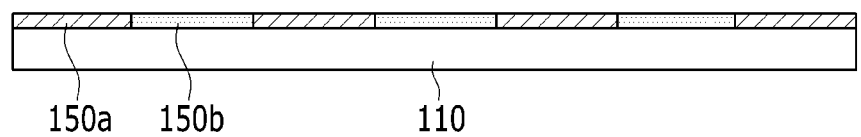

Next, referring to FIG. 15, a transparent inorganic material, such as $ZrO_x$, $TiO_2$, $SiN_x$, $SiO_x$, $MgF_3$ or the like, or a transparent organic material having a refractive index different from a refractive index of the material of the second phase shifting layer 150b, is deposited on the transparent substrate 110 through the opening in the second photosensitive film pattern 50b and the second phase shifting layer 150b to provide the first phase shifting layer 150a. Therefore, the first and second phase shifting layers 150a and 150b may be alternately arranged on the transparent substrate 110 in the x direction or the y direction. The first and second phase shifting layers 150a and 150b may be disposed in a same layer and may have substantially the same thickness as each other.

Then, the second photosensitive film pattern 50a is removed.

Figure 16:
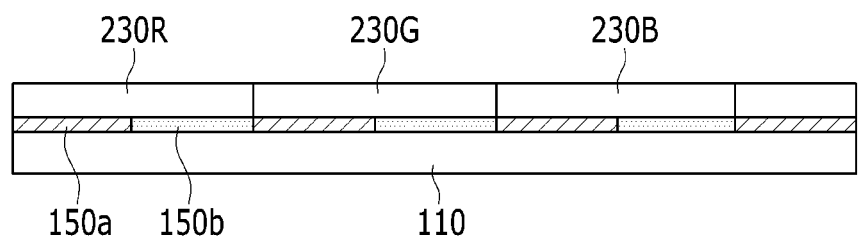

Next, referring to FIG. 16, a plurality of thin film transistors (not shown), a plurality of color filters 230R, 230G and 230B, an insulating layer, and the like, may be provided, e.g., formed, on the first and second phase shifting layers 150a and 150b to complete the lower display panel 100.

According to another exemplary embodiment of the invention, the first and second phase shifting layers 150a and 150b may be provided, e.g., formed, on the thin film transistor of the lower display panel 100 after the thin film transistor is provided on the transparent substrate 110. In such an embodiment, as in an exemplary embodiment described above with reference to FIGS. 10 and 11, the passivation layer 180 positioned on the first and second thin film transistors Qa and Qb may be replaced by the first and second phase shifting layers 150a and 150b.

In another exemplary embodiment, the first and second phase shifting layers 150a and 150b may be provided, e.g., formed, on the color filters 230R, 230G and 230B of the lower display panel 100 after the color filters 230R, 230G and 230B are provided.

According to another exemplary embodiment of the invention, the first phase shifting layers 150a and the second phase shifting layers 150b may be provided on or beneath the substrate 210 of the upper display panel 200 as described above. In one exemplary embodiment, for example, the light blocking member 220 may be provided on the first and second phase shifting layers 150a and 150b after the first and second phase shifting layers 150a and 150b are provided on the substrate 210, or the first and second phase shifting layers 150a and 150b may be provided on the light blocking member 220 after the light blocking member 220 is provided.

In an exemplary embodiment, the first and second phase shifting layers 150a and 150b that are patterned are not limited to being formed by the method as described above, but may be provided or formed by various patterning methods.

Next, a detailed structure of an exemplary embodiment of the display panel according to the invention will be described with reference to FIG. 17 together with FIG. 6 described above.

Figure 17:
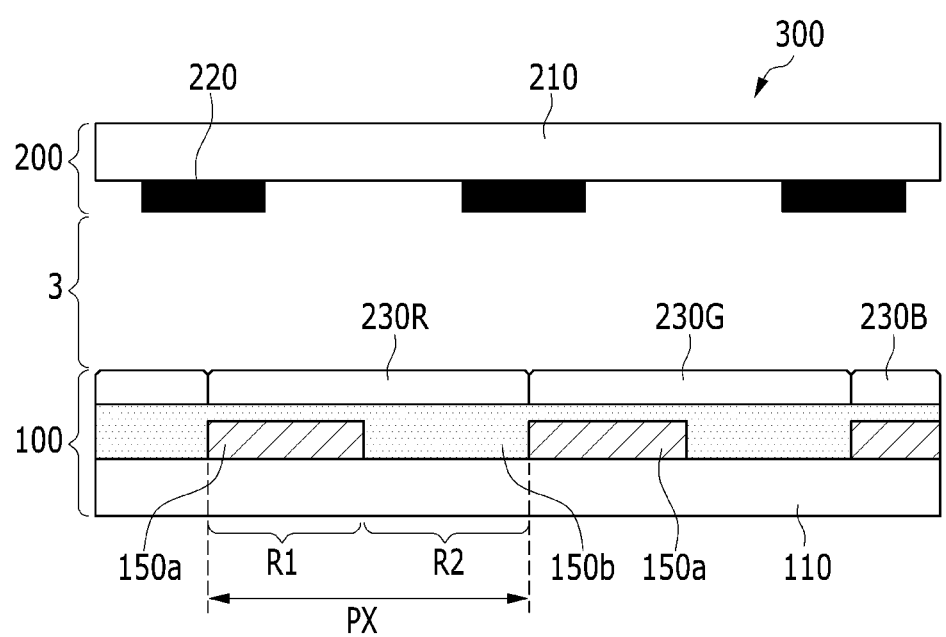
FIG. 17 is a cross-sectional view of an exemplary embodiment of a display panel according the invention.

FIG. 17 is a cross-sectional view of an exemplary embodiment of a display panel according to the invention.

The display panel shown in FIG. 17 is substantially the same as the display panel shown in FIG. 7 except for the first and second phase shifting layers 150a and 150b. The same or like elements shown in FIG. 17 have been labeled with the same reference characters as used above to describe the exemplary embodiments of the display panel shown in FIG. 7, and any repetitive detailed description thereof will hereinafter be omitted or simplified.

According to an exemplary embodiment, as shown in FIG. 17, the first phase shifting layer 150a may be disposed on the substrate 110, and the second phase shifting layer 150b may be disposed on the substrate 110 over or covering the first phase shifting layer 150a disposed on the substrate 110. In such an embodiment, the second phase shifting layer 150b overlaps the first phase shifting layer 150a. An upper surface of the second phase shifting layer 150a may be substantially flat, but not being limited thereto.

A refractive index n1 of the first phase shifting layer 150a may be greater than a refractive index n2 of the second phase shifting layer 150b, and may be, for example, approximately 2.0 or less. The first phase shifting layer 150a may include $ZrO_x$, $TiO_2$, $SiN_x$, $SiO_x$, $MgF_3$, or the like, having a high refractive index.

In an exemplary embodiment, an entire thickness of the first and second phase shifting layers 150a and 150b may be greater than the thickness d of the first and second phase shifting layers 150a and 150b of the exemplary embodiment of the display panel described above with reference to FIGS. 6 and 7, for example, by approximately 0.6 μm.

Next, an exemplary embodiment of a method of manufacturing a display panel, according to the invention, will be described with reference to FIGS. 18 to 21 together with FIG. 17 described above.

FIGS. 12 to 21 are cross-sectional views showing an exemplary embodiment of a method of manufacturing a display panel, according to the invention.

Figure 18:
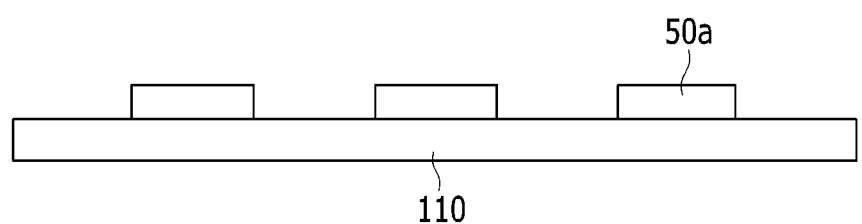
FIGS. 18 to 21 are cross-sectional views showing an exemplary embodiment of a method of manufacturing a display panel, according to the invention.

In an exemplary embodiment, referring to FIG. 18, a first photosensitive film pattern 50a is provided, e.g., formed, on a transparent substrate 110 using a photolithography process. In such an embodiment, a plurality of openings are defined through the first photosensitive film pattern 50a.

Figure 19:
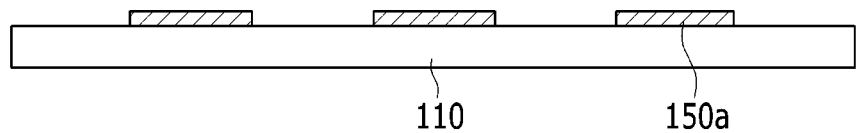

Next, referring to FIG. 19, a transparent inorganic material such as $ZrO_x$, $TiO_2$, $SiN_x$, $SiO_x$, $MgF_3$ or the like, or a transparent organic material having a high refractive index, is deposited on the transparent substrate 110 through the opening of the photosensitive film pattern 50a to form a first phase shifting layer 150a. Then, the first photosensitive film pattern 50a is removed.

Figure 20:
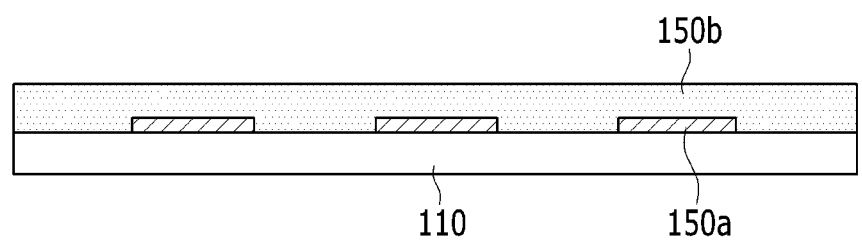

Next, referring to FIG. 20, a material such as an overcoat material or the like having a smaller refractive index n2 than a refractive index n1 of the material of the first phase shifting layer 150a is provided on the first phase shifting layer 150a and the transparent substrate 110, e.g., stacked over entire surfaces of the first phase shifting layer 150a and the transparent substrate 110, to form a second phase shifting layer 150b having an upper surface that is substantially planarized.

Figure 21:
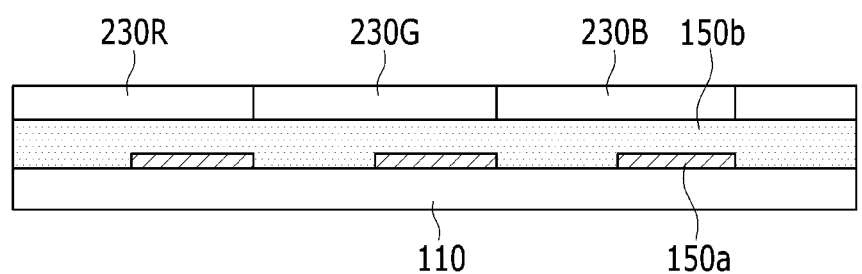

Next, referring to FIG. 21, a plurality of thin film transistors, a plurality of color filters 230R, 230G and 230B, an insulating layer, and the like, may be provided on the second phase shifting layer 150b to complete the lower display panel 100.

According to another exemplary embodiment of the invention, the first and second phase shifting layers 150a and 150b may be provided on the thin film transistor of the lower display panel 100 after the thin film transistor is provided. In such an embodiment, as in an exemplary embodiment described with reference to FIGS. 10 and 11, the passivation layer 180 positioned on the first and second thin film transistors Qa and Qb may be replaced by the first and second phase shifting layers 150a and 150b.

In an alternative exemplary embodiment, the first and second phase shifting layers 150a and 150b may be provided on the color filters 230R, 230G and 230B of the lower display panel 100 after the color filters 230R, 230G, and 230B are provided.

According to another exemplary embodiment of the invention, the first phase shifting layers 150a and the second phase shifting layers 150b may be provided on or beneath the substrate 210 of the upper display panel 200 described above. In one exemplary embodiment, for example, the light blocking member 220 may be provided on the first and second phase shifting layers 150a and 150b after the first and second phase shifting layers 150a and 150b are provided on the substrate 210, or the first and second phase shifting layers 150a and 150b may be provided on the light blocking member 220 after the light blocking member 220 is provided.

Next, a structure of an alternative exemplary embodiment of a display panel according to the invention will be described with reference to FIGS. 22 and 23.

Figure 22:
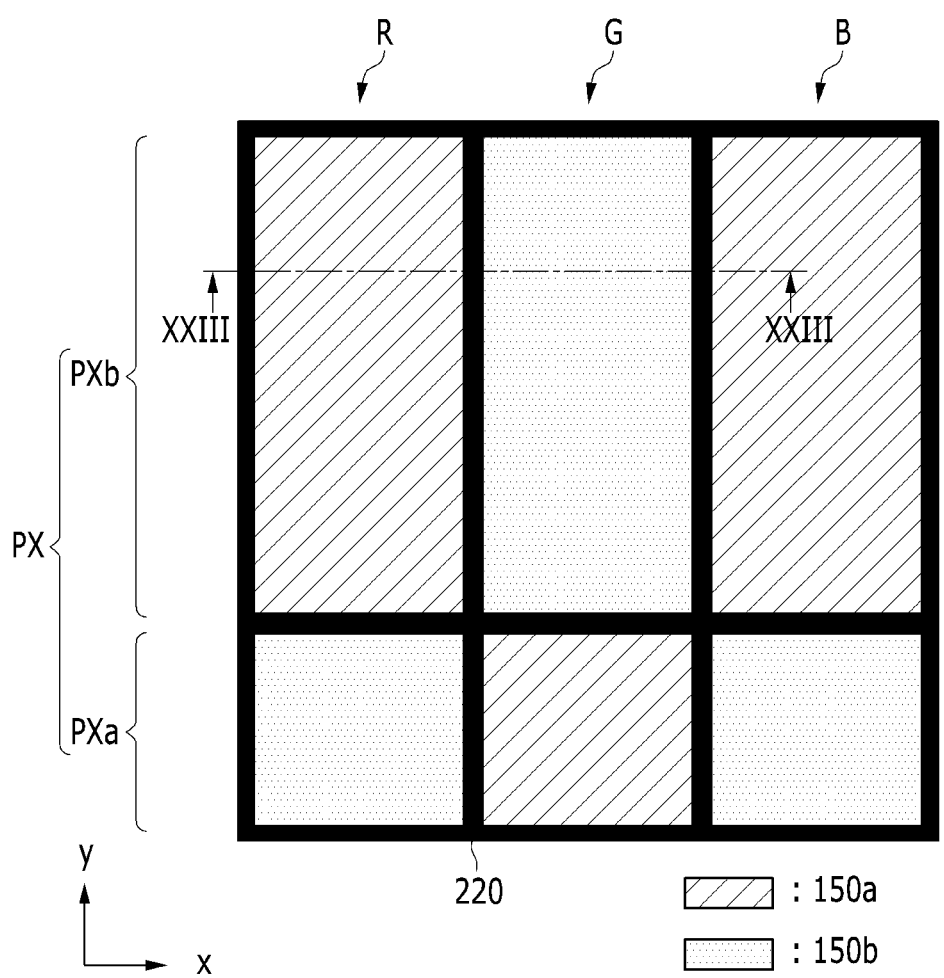
FIG. 22 is a layout diagram of a plurality of pixels in an alternative exemplary embodiment of a display panel according to the invention.
Figure 23:
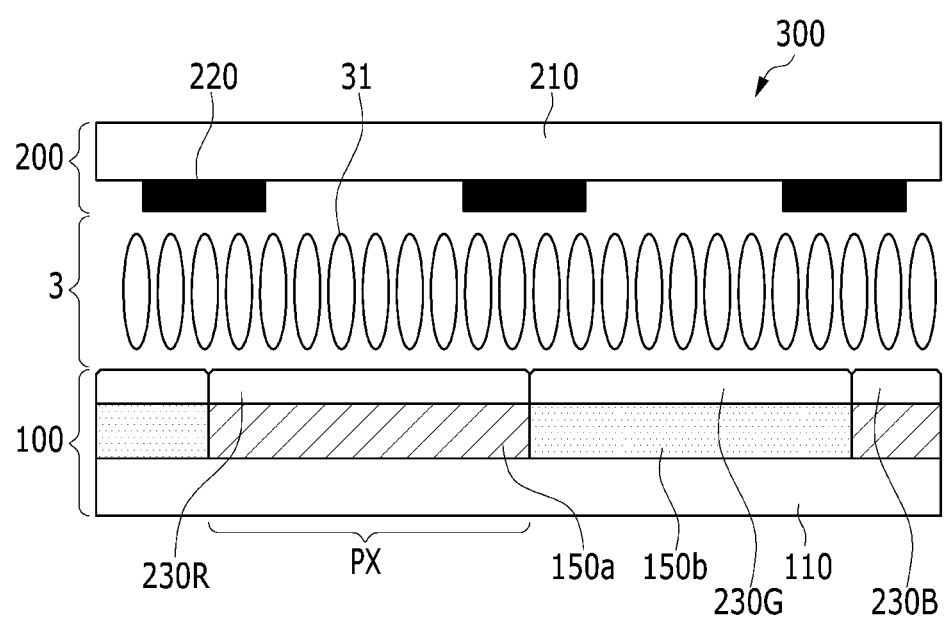
FIG. 23 is a cross-sectional view taken along line XXIII-XXIII of the display panel shown in FIG. 22.

FIG. 22 is a layout diagram of a plurality of pixels in an exemplary embodiment of a display panel according to the invention, and FIG. 23 is a cross-sectional view taken along line XXIII-XXIII of the display panel shown in FIG. 22.

The display panel shown in FIGS. 22 and 23 is substantially the same as the display panel shown in FIGS. 6 and 7 except for the first and second phase shifting layers 150a and 150b. The same or like elements shown in FIGS. 22 and 23 have been labeled with the same reference characters as used above to describe the exemplary embodiments of the display panel shown in FIGS. 6 and 7, and any repetitive detailed description thereof will hereinafter be omitted or simplified.

Referring to FIGS. 22 and 23, in an exemplary embodiment of the display panel 300 according to the invention, each sub-pixel PXa and PXb include one of a first phase shifting layer 150a and a second phase shifting layer 150b. In such an embodiment, the first and second phase shifting layers 150a and 150b having different refractive indices may be alternately disposed in a unit of the sub-pixels PXa and PXb.

The first and second phase shifting layers 150a and 150b that are different from each other are disposed in adjacent sub-pixels PXa and PXb for the same pixel PX or adjacent pixels PX, respectively, such that destructive interference of light occurs in a region between the adjacent sub-pixels PXa and PXb, and a blurring phenomenon due to diffraction of light generated when the light passes between grating patterns formed by the light blocking member 220 between the sub-pixels PXa and PXb and the like may be thereby substantially reduced or minimized.

In such an embodiment, each sub-pixel PXa and PXb may include or may not include the plurality of sub-regions R1 to R4 shown in FIG. 6.

Finally, a display panel according to an exemplary embodiment of the invention will be described with reference to FIG. 24.

Figure 24:
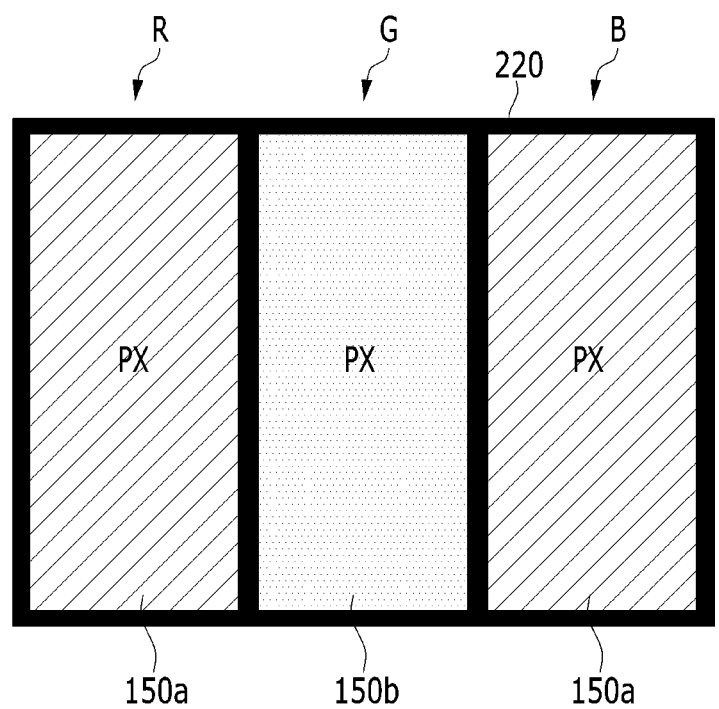
FIG. 24 is a layout diagram of a plurality of pixels in another alternative exemplary embodiment of a display panel according to the invention.

FIG. 24 is a layout diagram of a plurality of pixels in another alternative exemplary embodiment of a display panel according to the invention.

The display panel shown in FIG. 24 is substantially the same as the display panel shown in FIG. 6 or 22 except for the first and second phase shifting layers 150a and 150b. The same or like elements shown in FIG. 24 have been labeled with the same reference characters as used above to describe the exemplary embodiments of the display panel shown in FIGS. 6 and 22, and any repetitive detailed description thereof will hereinafter be omitted or simplified.

Referring to FIG. 24, in an exemplary embodiment of the display panel 300 according to the invention, each pixel PX may include one of a first phase shifting layer 150a and a second phase shifting layer 150b. In such an embodiment, the first and second phase shifting layers 150a and 150b having different refractive indices may be alternately disposed in a unit of the pixel PX.

The first and second phase shifting layers 150a and 150b that are different from each other are disposed in adjacent pixels PX representing different primary colors, respectively, such that destructive interference of light may occur in a region between the adjacent pixels PX, and a blurring phenomenon due to diffraction of light generated when the light passes between grating patterns formed by the light blocking member 220 between the pixels PX, and the like may be thereby substantially reduced or minimized.

In such an embodiment, each pixel PX may include or may not include the plurality of sub-pixels PXa and PXb or the plurality of sub-regions R1 to R4, shown in FIGS. 6 and 22.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display panel comprising:
a plurality of pixels; and
a first phase shifting layer and a second phase shifting layer, which overlap the pixels,
wherein
the first phase shifting layer and at least a portion of the second phase shifting layer are alternately arranged with each other, and
a phase difference between light having a predetermined wavelength transmitted through the first phase shifting layer and light of the predetermined wavelength transmitted through the second phase shifting layer is approximately 180 degrees,
wherein
each of the pixels comprises first and second sub-pixels which display an image based on different gamma curves from each other, and
the first phase shifting layer includes a portion disposed in a region corresponding to the first sub-pixel of a first pixel of the pixels, and
the second phase shifting layer includes a portion disposed in a region corresponding to the second sub-pixel of the first pixel and adjacent to the first sub-pixel of the first pixel.

2. The display panel of claim 1, wherein:
the plurality of pixels include a second pixel,
the first phase shifting layer includes a portion disposed in a region corresponding to the second sub-pixel of the second pixel, and
the second phase shifting layer includes a portion disposed in a region corresponding to the first sub-pixel of the second pixel.

3. The display panel of claim 1, wherein
a refractive index of the first phase shifting layer is greater than a refractive of the second phase shifting layer.

4. The display panel of claim 3, wherein
the first and second phase shifting layers are disposed in a same layer and have substantially the same thickness as each other.

5. The display panel of claim 4, wherein
at least one of the first and second phase shifting layers comprises a transparent inorganic material comprising $ZrO_x$, $TiO_2$, $SiN_x$, $SiO_x$ or $MgF_3$, or a transparent organic material.

6. The display panel of claim 3, wherein
a portion of the second phase shifting layer covers the first phase shifting layer.

7. The display panel of claim 6, wherein
the first phase shifting layer comprises a transparent inorganic material comprising $ZrO_x$, $TiO_2$, $SiN_x$, $SiO_x$ or $MgF_3$, or a transparent organic material.

8. The display panel of claim 1, further comprising:
a light blocking member which blocks light leakage between the first sub-pixel and the second sub-pixel of the pixel.

9. A display panel comprising:
a plurality of pixels;
two substrates disposed opposite to each other; and
a first phase shifting layer and a second phase shifting layer, which overlap the pixels,
wherein the first phase shifting layer and at least a portion of the second phase shifting layer are alternately arranged with each other, a phase difference between light having a predetermined wavelength transmitted through the first phase shifting layer and light of the predetermined wavelength transmitted through the second phase shifting layer is approximately 180 degrees, each of the pixels comprises a liquid crystal layer disposed between the two substrates and comprising a plurality of liquid crystal molecules, each of the pixels comprises a plurality of sub-regions in which arrangement directions of the liquid crystal molecules are different from each other when an electric field is generated in the liquid crystal layer, the first phase shifting layer is disposed in a region corresponding to a first sub-region among the sub-regions of a pixel of the pixels, and the second phase shifting layer is disposed in a region corresponding to a second sub-region among the sub-regions of the pixel and adjacent to the first sub-region of the pixel.

10. The display panel of claim 9, wherein
a refractive index of the first phase shifting layer is greater than a refractive index of the second phase shifting layer.

11. The display panel of claim 10, wherein
the first and second phase shifting layers are disposed in a same layer and have substantially the same thickness as each other.

12. The display panel of claim 11, wherein
at least one of the first and second phase shifting layers comprises a transparent inorganic material comprising $ZrO_x$, $TiO_2$, $SiN_x$, $SiO_x$ or $MgF_3$, or a transparent organic material.

13. The display panel of claim 10, wherein
a portion of the second phase shifting layer covers the first phase shifting layer.

14. The display panel of claim 13, wherein
the first phase shifting layer comprises a transparent inorganic material comprising $ZrO_x$, $TiO_2$, $SiN_x$, $SiO_x$ or $MgF_3$, or a transparent organic material.

* * * * *